United States Patent Office 3,515,944
Patented June 2, 1970

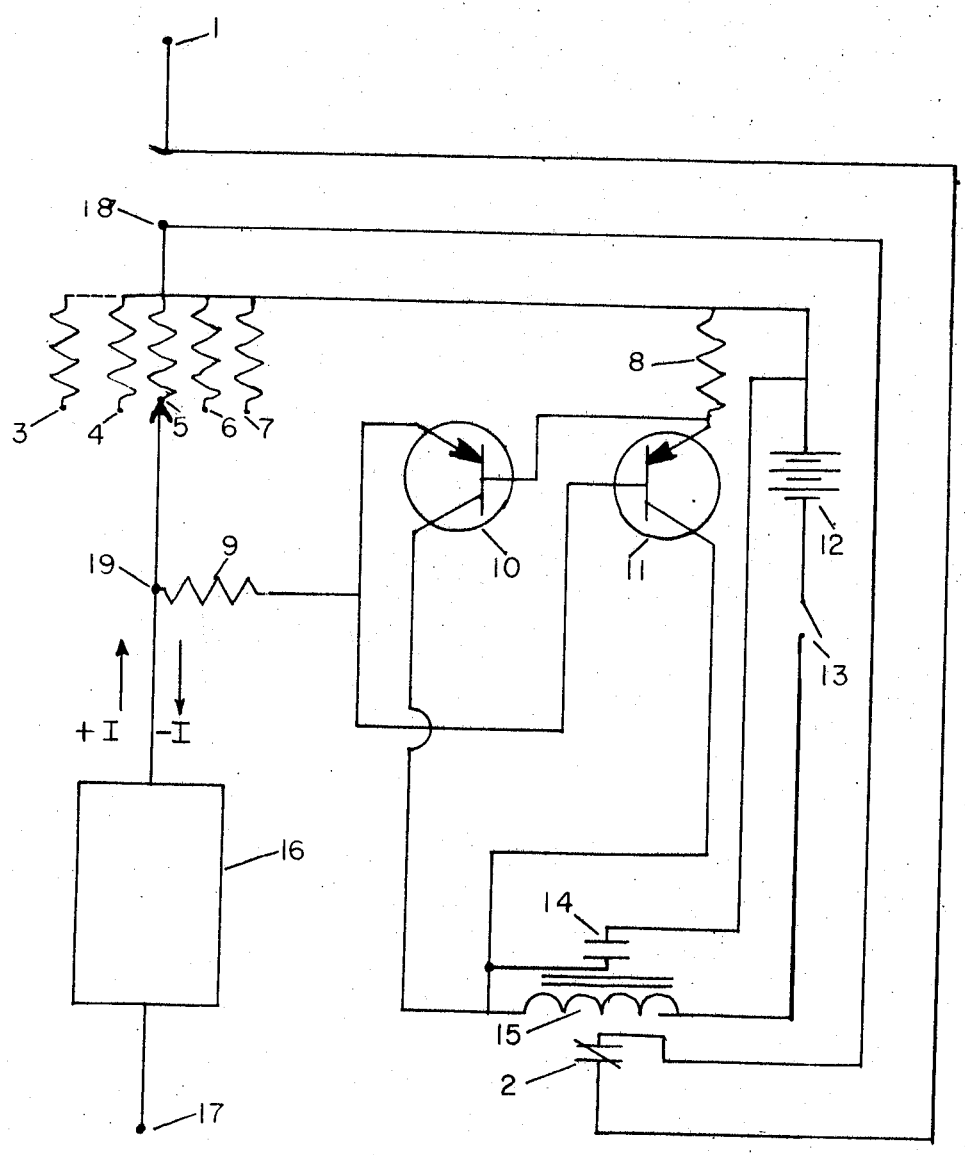

3,515,944
TRANSISTORIZED CIRCUIT BREAKER (OR FUSE)
Frank P. Defina, 556 N. Vine St., Hazleton, Pa. 18201
Filed Dec. 9, 1966, Ser. No. 600,590
Int. Cl. H02h 3/08
U.S. Cl. 317—33                4 Claims

ABSTRACT OF THE DISCLOSURE

An electrical load is protected against excessive current flow by interrupting its series circuit through a selected resistor by opening of a normally closed relay switch upon energization of a transistor controlled relay coil. The relay coil once energized, remains energized from a D.C. source of current which is adapted to be temporarily interrupted for reset purposes.

By merely selecting any one a plurality of resistors variously selected currents are limited to certain maximum values before these currents are reduced to zero by the rest of the circuit action. The electrical current flows mainly in a circuit whose source is in series with a current-protected circuit or device. Selection of any of the different resistors controls the current from small milliampere (or even microampere) values to ampere values to zero values by action of a circuit breaker.

Stated otherwise the invention provides overcurrent circuit-breaker (fuse) protection to electrical circuits properly connected to it. The overcurrent protection can be selected by a simple turn of a knob to provide current protection to a circuit in the order of microamperes or to another circuit whose fusing protection is of the order of amperes. The invention might and could be called "A Variamp Circuit Protector," or it could be called a "Variable Current Transistorized Fuse," etc.

Referring to the drawing, a circuit or device 16, with terminals 17–19, is to be protected from overcurrents (±I). The circuit 16 is connected between terminals 1 and 17 in series with a selected one of a plurality of resistors 3, 4, 5, 6, 7, etc. through terminal 18 and through normally closed relay contacts 2 associated with relay coil 15. Terminals 1 and 17 are the source terminals to which circuit 16 would be connected if the invention was not used.

When the invention is used, terminals 1–17 are connected to a D.C. or A.C. source of electricity. Switch 13 is closed. If the circuit 16 current is normal (or even below normal) this current (±I) exists practically in the same amount in any one of the selected resistors 3, 4, 5, 6, 7. If the product voltage, +I or −I times the selected resistor ohmmage is low (IXR is low), then the input voltage to the degenerative base-emitter circuit of transistors 10 and 11 is low. The bases and emitters of the transistors are interconnected while the output collectors are connected to one of the terminals of the relay coil 15 opposite the terminal connected to the negative side of battery 12 through switch 13. The positive side of the battery is connected to a bias voltage line to which the emitter of transistor 11 is connected through resistor 8. Under the low voltage condition the transistor collector current(s) will also be low so that the current through relay coil 15 will be low and below "pull-in" values. As a consequence normally closed contacts 2 will remain closed and normally open contacts 14, will stay open and the protected circuit 16 will remain electrically energized.

Should circuit 16 become faulty, or somehow demand abnormally high current(s) +I or −I, or both ±I, then the product voltage IR will become high, the input voltage to the base-emitter circuits of transistors 10 and 11 will become high, and will be of the proper polarity to increase the transistor(s) collector current(s) so that relay current is high and relay coil 15 "pulls-in" breaking contacts 2 which opens the load circuit reducing to zero the current ±I in the protected circuit 16. At the same time the contacts 14 of relay 15 are closed, putting full control voltage of battery 12 across relay coil 15, insuring that the relay contacts 2 stay open and that current to circuit 16 is zero.

After the abnormal condition that caused excessive current in circuit 16 has been corrected, recycling can be initiated by simply opening and closing the transistor(s)' collector supply voltage switch 13.

Resistors 9 and 8 are interconnected between the emitter circuits of the transistors to increase the potential difference between the emitter and base of each transistor determined by the selection of one of the resistors 3–7 and provide additional degeneration. The resistor 9 also contributes to high input resistance for transistors 10 and 11 between the input juncture 19 and the base of transistor 11. It will therefore be apparent that the point at which the transistors become sufficiently conductive to effectively energize relay coil 15, may be selectively changed to meet different requirements because of the base-emitter circuit characteristics below a maximum current and potential at juncture 19 preselected by the resistor connected in series with the device 16 across the variable voltage terminals 1 and 17.

I claim:
1. In combination with a load adapted to be connected in series with a selected one of a plurality of resistors across a source of variable voltage, a protective device for preventing flow of excessive current through the load comprising relay means for disconnecting said load from the source of variable voltage when energized, current sensing means connected across said selected one of the resistors for initially energizing the relay means in response to increase in load current above a maximum value determined by the selected one of the resistors, and resettable means connected to the current sensing means for rendering the same operative and maintaining the relay means energized, said sensing means including a source of control voltage, current conducting means connected between the load and the relay means for increasing the current through the relay means, and circuit means connecting the current conducting means to the source of control voltage in a current reducing mode below said maximum value of the load current.

2. The combination of claim 1 wherein said current conducting means includes a pair of transistors each having a base, an emitter and a collector, said circuit means including input resistance means connecting the load to the emitter of one of the transistors and the base of the other of the transistors and bias means connecting the base of said one of the transistors and the emitter of the other of the transistors to the plurality of the resistors and the source of control voltage.

3. The combination of claim 2 wherein said resettable means includes relay holding means connecting the relay means across the source of control voltage in response to said initial energization of the relay means and a reset switch connecting the source of control voltage to the relay means in series with the current conducting means.

4. The combination of claim 1 wherein said resettable means includes relay holding means connecting the relay means across the source of control voltage in response to said initial energization of the relay means and a reset switch connecting the source of control voltage to the relay means in series with the current conducting means.

References Cited
UNITED STATES PATENTS

| | | | |
|---|---|---|---|
| 3,170,088 | 2/1965 | Coutsourakis | 317—33 X |
| 3,222,575 | 12/1965 | Dexter | 317—33 X |
| 3,235,802 | 2/1966 | Biard et al. | 324—158 |
| 3,262,015 | 7/1966 | McNamee et al. | 317—20 |

JAMES D. TRAMMELL, Primary Examiner

U.S. Cl. X.R.

317—54